United States Patent
Yamaguchi et al.

(10) Patent No.: US 7,246,491 B2
(45) Date of Patent: Jul. 24, 2007

(54) ACTUATOR

(75) Inventors: Hiroyoshi Yamaguchi, Yokohama (JP); Minoru Takakura, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 137 days.

(21) Appl. No.: 10/882,831

(22) Filed: Jul. 1, 2004

(65) Prior Publication Data

US 2005/0000352 A1    Jan. 6, 2005

(30) Foreign Application Priority Data

Jul. 2, 2003    (JP) .............................. 2003-190371

(51) Int. Cl.
*F01B 29/08*    (2006.01)
*F15B 15/22*    (2006.01)

(52) U.S. Cl. ........................... 60/635; 91/402; 180/281; 60/407

(58) Field of Classification Search .................. 91/325, 91/400, 402; 60/407, 412, 632, 635; 180/281; 92/19
See application file for complete search history.

(56) References Cited

U.S. PATENT DOCUMENTS 3,747,478 A * 7/1973 Dunn et al. ............... 92/165 R
3,941,141 A * 3/1976 Robert ............................ 137/1
4,355,564 A * 10/1982 Gidlund ........................ 91/325
5,407,332 A * 4/1995 Yedinak et al. ............... 92/241

FOREIGN PATENT DOCUMENTS

| DE | 4236623 | 5/1994 |
|---|---|---|
| EP | 1186786 | 3/2002 |
| JP | 55-157486 | 12/1980 |
| JP | 63-77104 | 5/1988 |
| JP | 11-115680 | 4/1999 |
| JP | 2002-29369 | 1/2002 |

* cited by examiner

*Primary Examiner*—F. Daniel Lopez
(74) *Attorney, Agent, or Firm*—Ohlandt, Greeley, Ruggiero & Perle, L.L.P.

(57) ABSTRACT

An actuator includes a hollow cylinder which has a first portion and a second portion. The inner diameter of the first portion is larger than that of the second portion. A piston is inserted in the cylinder. The actuator has a gas generator which supplies a gas into the cylinder to move the piston toward the first portion. The seal member keeps airtightness between the piston and the cylinder when the piston stays in the second portion and flows the gas when the piston stays in the first portion. A hollow stopper is arranged in the first portion and stops the piston. The stopper has a vent groove which is provided on the inner surface and connects the interior of the cylinder to the open end. A piston rod is jointed to the piston and housed in the cylinder. The piston rod moves along the axis with the piston.

3 Claims, 3 Drawing Sheets

ACTUATOR

CROSS-REFERENCE TO RELATED APPLICATIONS

This application is based upon and claims the benefit of priority from prior Japanese Patent Application No. 2003-190371, filed Jul. 2, 2003, the entire contents of which are incorporated herein by reference.

BACKGROUND OF THE INVENTION

1. Field of the Invention

The present invention relates to an actuator applied to, e.g., the hood apparatus of a car.

2. Description of the Related Art

If a pedestrian were hit on the front of a running car, the lower half of his/her body may be stricken by the bumper at the nose of the car. In this case, he/she is thrown on the hood of the car and hit, e.g., the head against it.

Under these circumstances, some cars have hood apparatuses. A hood apparatus is designed to operate an actuator to push the hood upward when a sensor arranged at the nose of the car detects a pressure with a predetermined value or more. When the hood is pushed up, a gap is formed between the hood and the devices in the engine room. Even when a pedestrian jumps up and hits against the hood, the collision energy is absorbed by hood deformation.

A hood apparatus is known, which is disclosed in Jpn. Pat. Appln. KOKAI Publication No. 2002-29369. The actuator in this hood apparatus can cause the piston pin (piston rod) to project from the cylinder and drop again in the cylinder.

This actuator comprises a piston stop member which stops the raised piston pin to prevent it from leaving the cylinder unit, a lock piece which locks the piston pin stopped by the function of the piston stop member to prevent it from dropping, a compression spring which elastically pushes the lock piece to the cylinder unit, and an unlock means which returns the lock piece to a predetermined position to cancel the lock function of the lock piece. In this actuator, when the unlock means cancels the lock function of the lock piece, the piston pin drops. The unlock means is controlled by the control unit in the hood apparatus.

Another hood apparatus is known, which is disclosed in Jpn. Pat. Appln. KOKAI Publication No. 11-115680. The actuator in this hood apparatus has an exhaust hole with a very small hole diameter at the butt portion between the actuator and the piston portion of the push rod (piston rod) of the cylinder unit in the normal state. The exhaust hole is closed by a sealing plug. A bracket is attached to the projecting portion of the connecting portion of the push rod from the cylinder unit. The bracket and sealing plug are connected by a wire. When the piston rod moves up, the sealing plug is pulled through the wire and removed from the exhaust hole. A high-pressure gas in the cylinder unit is pushed out from the exhaust hole so that the push rod drops at a predetermined speed.

However, the technique disclosed in Jpn. Pat. Appln. KOKAI Publication No. 2002-29369 has no arrangement which discharges the high-pressure gas from the cylinder unit. For this reason, even when the lock function of the lock piece is canceled by the unlock means, the piston pin may be pushed by the high-pressure gas and not satisfactorily drop in the cylinder unit.

On the other hand, in the technique disclosed in Jpn. Pat. Appln. KOKAI Publication No. 11-115680, the high-pressure gas in the cylinder unit is discharged outside by forming the exhaust hole in the cylinder unit. In forming the exhaust hole in the cylinder unit, a burr may remain in the cylinder unit. The burr is not preferable because it increases the sliding resistance of the piston in the cylinder unit. In addition, the sealing plug that closes the exhaust hole may be removed from the exhaust hole due to the high-pressure gas before the push rod reaches the full-stroke position. If the sealing plug is removed from the exhaust hole before the push rod reaches the full-stroke position, the push rod may not satisfactorily project from the piston portion.

BRIEF SUMMARY OF THE INVENTION

The present invention has been made in consideration of the above situation, and has as its object to provide an actuator except for providing a exhaust hole in the cylinder and can discharge the gas outside the cylinder after the piston rod reaches the full-stroke position.

An actuator according to an aspect of the present invention comprises:

a hollow cylinder which has a first portion with an open end and a second portion, the cylinder having the first portion with a larger inner diameter than that of the second portion;

a piston which is arranged in the cylinder;

a gas generator which supplies a gas into the cylinder and moves the piston in a direction of the first portion by pressure of the gas;

a seal member which is arranged between the piston and the cylinder, the seal member holding airtightness between the piston and the cylinder when the piston opposes the second portion of the cylinder and making the gas flow between the piston and the cylinder when the piston opposes the first portion of the cylinder;

a hollow stopper which is arranged in the first portion of the cylinder and stops movement of the piston when the piston abuts against the stopper, the stopper having, on an inner surface, a vent groove which makes an interior of the cylinder communicate with the open end of the cylinder; and a piston rod which is arranged on the piston and at least partially stored in the cylinder, the piston rod being movable along a direction of axis of the cylinder as the piston moves.

According to the actuator of an aspect of the present invention, when a power is generated by the gas generator, the piston moves toward the first portion of the cylinder by the gas pressure. Accordingly, the piston rod arranged on the piston can move toward the first portion along the axial direction of the cylinder. Accordingly, the piston rod can project from the open end formed at the first portion of the actuator.

The stopper is arranged in the first portion of the cylinder. For this reason, the piston can be stopped at a position where the piston abuts against the stopper. This is the full-stroke state of the piston rod.

The vent groove which makes the interior of the cylinder communicate with the open end of the cylinder is formed in the hollow stopper. For this reason, even in the full-stroke state of the piston rod, i.e., even when the piston abuts against the stopper, and the gas hardly flows between the piston and the stopper, the gas in the cylinder can be discharged outside from the open end of the cylinder through the vent groove.

As described above, according to the actuator of one aspect of the present invention, the gas in the cylinder can be discharged from the cylinder after the piston rod reaches the full-stroke position without forming any exhaust hole in the cylinder.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

For actuators 1 according to the first and second embodiments, one end (right in FIGS. 1, 2, and 4) of a cylinder 2 from which a piston rod 8 projects will be defined as a front side, and the other end (left in FIGS. 1, 2, and 4) as a rear side.

The first embodiment of the present invention will be described with reference to FIGS. 1 and 2.

Figure 1:
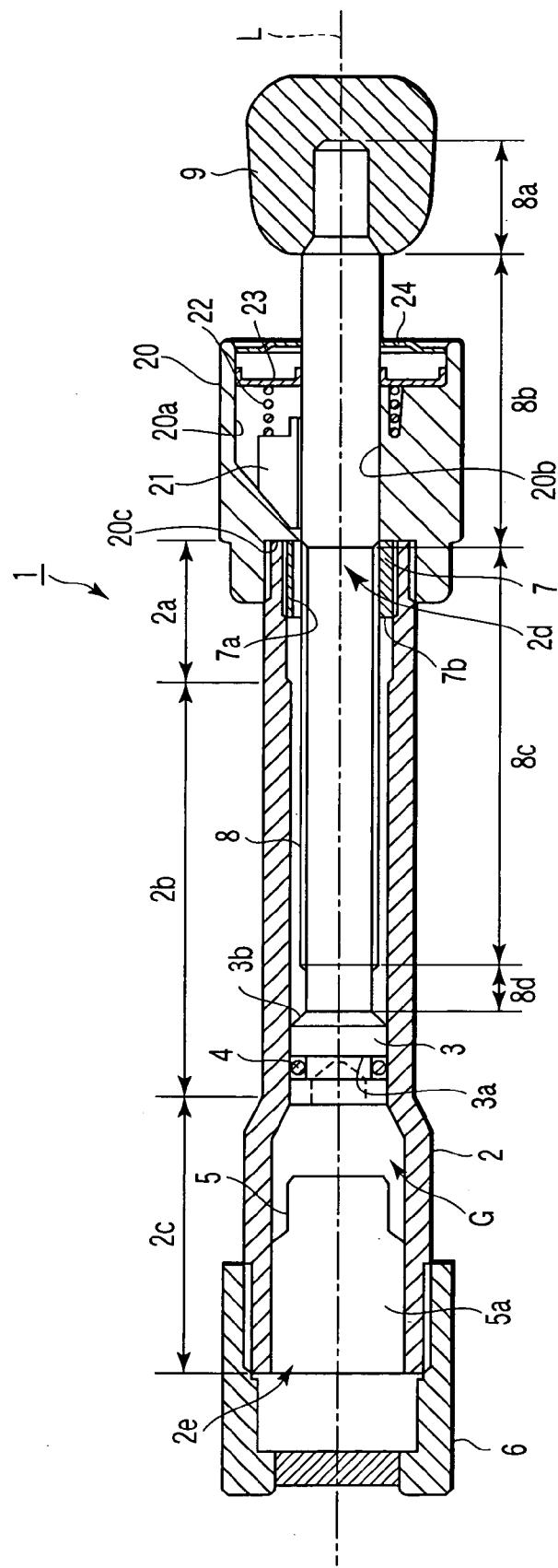
FIG. 1 is a sectional view showing the initial state of an actuator according to the first embodiment of the present invention, in which the piston rod is inserted to the cylinder.

As shown in FIG. 1, the actuator 1 of this embodiment comprises the cylinder 2, a piston 3, an O-ring 4 serving as a sealing member, a gas generator 5, a cap 6, a stopper 7, the piston rod 8, and a piston head 9.

Figure 2:
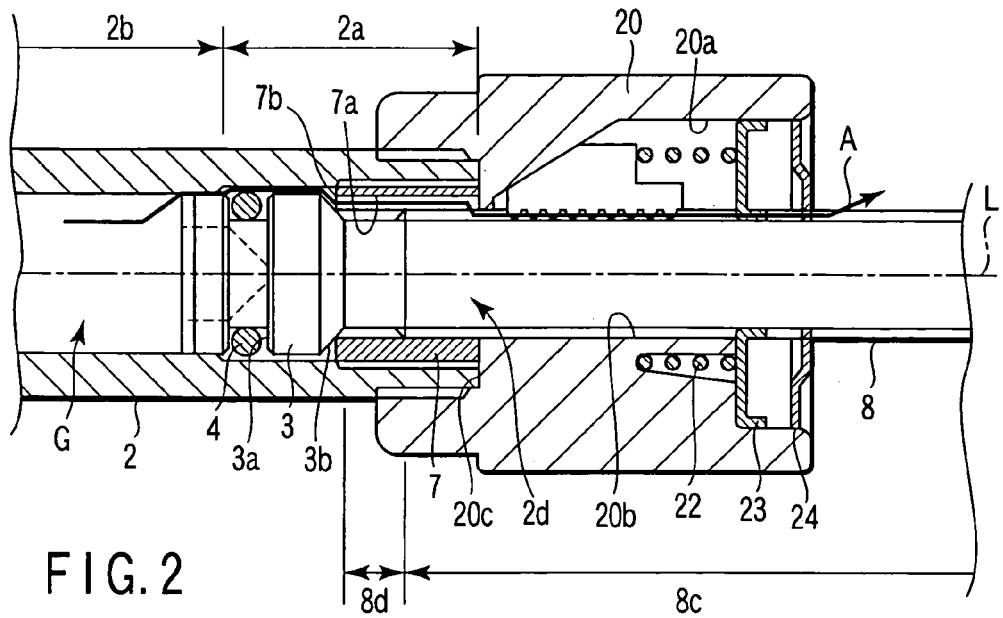
FIG. 2 is a sectional view showing a part of the actuator shown in FIG. 1 in a state in which the piston rod reaches the full-stroke position.
Figure 3:
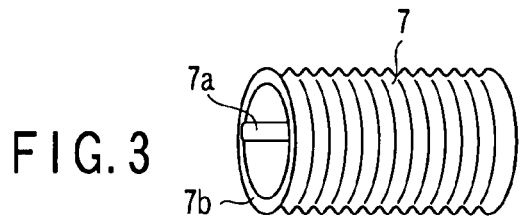
FIG. 3 is a perspective view showing the stopper in the actuator shown in FIG. 1.

As shown in FIGS. 1 to 3, the hollow cylinder 2 has open ends 2d and 2e at the front and rear ends, respectively. The cylinder 2 has a front end portion 2a as the first part, an intermediate portion 2b as the second part, and a rear end portion 2c as the third part. The intermediate portion 2b is located between the front end portion 2a and the rear end portion 2c. The inner diameter of the front end portion 2a of the cylinder 2 is larger than that of the intermediate portion 2b. The outer and inner diameters of the rear end portion 2c of the cylinder 2 are larger than those of the intermediate portion 2b and front end portion 2a. The cylinder 2 has a cylinder head 20. The cylinder head 20 will be described later.

The piston 3 is stored in the cylinder 2. The outer diameter of the piston 3 is set such that it can slide in the intermediate portion 2b of the cylinder 2 in the direction of axis L of the cylinder 2. The piston 3 has a groove portion 3a along the circumferential direction. The O-ring 4 is fitted on the groove portion 3a. That is, the O-ring 4 is arranged between the piston 3 and the cylinder 2. In the initial state (FIG. 1) in which the piston 3 opposes the intermediate portion 2b of the cylinder 2, the O-ring 4 keeps airtightness between the piston 3 and the intermediate portion 2b of the cylinder 2. In the projecting state (FIG. 2) of the piston rod 8, in which the piston 3 opposes the front end portion 2a of the cylinder 2, the O-ring 4 generates a gap between the piston 3 and the front end portion 2a of the cylinder 2 to make a gas flow.

The gas generator 5 has a gas generation unit 5a which stores gunpowder that generates a gas. A lead wire (not shown) to ignite a gas generation body (not shown) stored in the gas generation unit 5a leads out from it. The gas generator 5 is arranged in the cylinder 2 while fitting the gas generation unit 5a in the open end 2e and rear end portion 2c of the cylinder 2. The gas generator 5 is covered with the cap 6. The gas generator 5 is fixed in the cylinder 2 by threadably engaging the cap 6 with the rear end portion 2c of the cylinder 2.

A gas chamber G is formed in the cylinder 2. The gas chamber G is located behind the piston 3 and, in this embodiment, between the piston 3 and the gas generation unit 5a. The gas generator 5 supplies a gas to the gas chamber G to make the piston 3 slide from the intermediate portion 2b toward the front end portion 2a of the cylinder 2 by the gas pressure. The gas generator 5 is not limited to the above-described device. The gas generator 5 may use, e.g., an accumulator.

The stopper 7 abuts against the piston 3 and stops its movement. In this embodiment, the stopper 7 is arranged in the front end portion 2a of the cylinder 2.

More specifically, as shown in FIGS. 1 to 3, the stopper 7 is formed hollow and has open front and rear ends. A male screw is formed on the outer surface of the stopper 7. The stopper 7 threadably engages with the inner surface of the front end portion 2a of the cylinder 2. A vent groove 7a which makes the interior of the front end portion 2a of the cylinder 2 communicate with the open end 2d on the front side of the cylinder 2 is formed on the inner surface of the stopper 7. In this embodiment, the vent groove 7a is formed along the longitudinal direction of the stopper 7. The longitudinal direction of the stopper 7 is parallel to the direction of axis L of the cylinder 2. A rear end face 7b of the stopper 7 serves as the butt surface to the piston 3.

The piston rod 8 is arranged on, e.g., a front end face 3b. The outer diameter of the piston rod 8 is set such that it can move along the direction of axis L of the cylinder 2. The piston 3 and piston rod 8 can integrally be formed by, e.g., grinding one round bar.

In this embodiment, the piston rod 8 has a head connecting portion 8a, large-diameter portion 8b, male screw portion 8c, and small-diameter portion 8d sequentially from the front to the rear side. The piston head 9 threadably engages with the head connecting portion 8a. The outer diameter of the large-diameter portion 8b is larger than that of the small-diameter portion 8d and smaller than the inner diameter of the intermediate portion 2b of the cylinder 2. The male screw portion 8c has a male screw on its outer surface.

In the initial state shown in FIG. 1, the small-diameter portion 8d and male screw portion 8c of the piston rod 8 are stored in the cylinder 2. The male screw portion 8c of the piston rod 8 extends through the stopper 7. Airtightness is held between the piston 3 and the intermediate portion 2b of the cylinder 2 by the O-ring 4, as described above. Hence, the gas chamber G has the airtight state.

The cylinder head 20 has a storage unit 20a which stores a threaded piece 21, coil spring 22, packing 23, and disc spring 24, and a through hole 20b which receives the piston rod 8. The storage unit 20a communicates with the through hole 20b. The storage unit 20a is open to the front side. The cylinder head 20 has a cylinder storage recess portion 20c at the rear end. The cylinder storage recess portion 20c has a female screw on the inner surface.

The cylinder head 20 threadably engages with the outer surface of the front end portion 2a of the cylinder 2. The female screw of the cylinder head 20 and the male screw of the cylinder 2 are preferably threadably engaged with each other while applying an adhesive to at least one of them. With this structure, the waterproofness and airtightness in fastening between the cylinder head 20 and the cylinder 2 can be increased.

The disc spring 24 is arranged at the open end of the storage unit 20a of the cylinder head 20. The packing 23 is arranged behind the disc spring 24. The coil spring 22 is stored in the storage unit 20a of the cylinder head 20 while making its front end portion abut against the packing 23. The threaded piece 21 has a female screw on the inner surface. The threaded piece 21 is biased by the coil spring 22 to abut against a wall surface which forms the storage unit 20a.

In the initial state shown in FIG. 1, the large-diameter portion 8b of the piston rod 8 extends through the through hole 20b of the cylinder head 20. Part of the large-diameter portion 8b and the head connecting portion 8a of the piston rod 8 project from the cylinder head 20. The piston head 9 threadably engages with the head connecting portion 8a projecting from the cylinder head 20. Airtightness is held between the inner surface of the storage unit 20a of the cylinder head 20 and the outer surface of the large-diameter portion 8b of the piston rod 8 by the packing 23. The threaded piece 21 is stored in the storage unit 20a of the cylinder head 20 while opposing the large-diameter portion 8b of the piston rod 8.

This actuator operates in the following way.

When the gas generator 5 operates (a current is supplied to the gas generation body through the lead wire), the gas generation body is ignited. The ignited gas generation body quickly burns and jets a gas to the gas chamber G. In the initial state, as described above, airtightness is held between the piston 3 and the intermediate portion 2b of the cylinder 2 by the O-ring 4. In addition, airtightness is held between the cylinder head 20 and the large-diameter portion 8b of the piston rod 8 by the packing 23. Hence, the pressure in the gas chamber G satisfactorily increases. When the gas pressure in the gas chamber G increases, the piston 3 is pushed from the rear side to the front side in the intermediate portion 2b of the cylinder 2. Accordingly, the piston rod 8 projects from the open end 2d at the front end of the cylinder 2. At this time, since the male screw portion 8c of the piston rod 8 threadably engages with the threaded piece 21, the piston rod 8 projects from the open end 2d at the front end of the cylinder 2 while being guided by the threaded piece 21.

When the front end face 3b of the piston 3 abuts against the rear end face 7b of the stopper 7, the movement of the piston 3 is stopped. This is the full-stroke state of the piston rod 8 (FIG. 2). In this embodiment, when the piston rod 8 reaches the full-stroke position, most part except the small-diameter portion 8d projects from the open end 2d of the cylinder 2 to the front side.

In the full-stroke state of the piston rod 8, the O-ring 4 opposes the front end portion 2a having a larger inner diameter than the intermediate portion 2b. Hence, a gap is formed between the O-ring 4 and the inner surface of the cylinder 2 so that the gas can flow. The packing 23 opposes the male screw portion 8c of the piston rod 8. Hence, a gap is also formed between the packing 23 and the piston rod 8 so that the gas can flow.

The hollow stopper 7 has, on its inner surface, the vent groove 7a which makes the interior of the front end portion 2a of the cylinder 2 communicate with the open end 2d at the front end of the cylinder 2. Even in the full-stroke state of the piston rod 8, i.e., even when the piston 3 abuts against the stopper 7, and the gas hardly flows between the piston 3 and the stopper 7, the gas in the front end portion 2a of the cylinder 2 can be discharged outside from the open end 2d of the cylinder 2 through the vent groove 7a.

After the piston rod 8 reaches the full-stroke position, the gas in the gas chamber G is discharged outside through the space between the cylinder 2 and the piston 3, the space between the cylinder 2 and the O-ring 4, the space in the front end portion 2a of the cylinder 2, the vent groove 7a, the space between the threaded piece 21 and the piston rod 8, the space between the packing 23 and the piston rod 8, and the space between the disc spring 24 and the piston rod 8, as indicated by an arrow A in FIG. 2. When the piston rod 8 is rotated in a direction in which it is threadably inserted to the cylinder 2, i.e., in the return direction reverse to the rotating direction of the piston rod 8 which is projecting, the piston rod 8 and piston 3 can easily be returned to the initial state.

As described above, according to this embodiment, the hollow stopper 7 has, on its inner surface, the vent groove 7a which makes the interior of the front end portion 2a of the cylinder 2 communicate with the open end 2d at the front end of the cylinder 2. Hence, after the piston rod 8 reaches the full-stroke position, the gas in the cylinder 2 can be discharged outside.

When an exhaust hole is formed in the cylinder 2 to discharge the gas from the cylinder 2, a burr may remain in the cylinder 2. In this embodiment, however, since no exhaust hole need be formed to discharge the gas from the cylinder 2, no burr remains in the cylinder 2. Hence, the piston 3 can satisfactorily slide in the cylinder 2. In addition, it is also unnecessary to close an exhaust hole by a sealing plug. The problem that the sealing plug is removed from the exhaust hole by the gas generated by the gas generator 5 can be solved. Hence, when the gas generator 5 is operated, the piston rod 8 can satisfactorily be operated.

Figure 4:
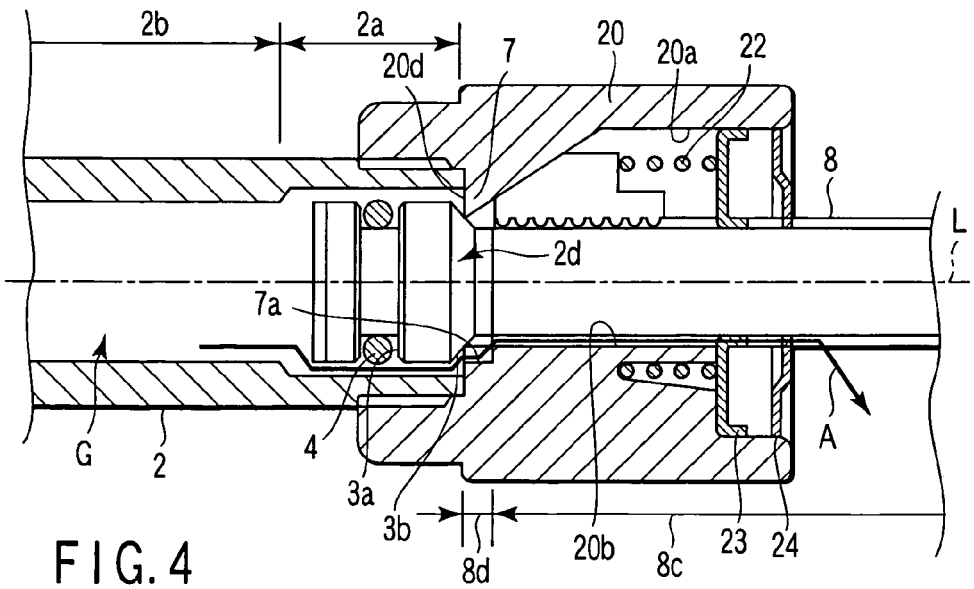
FIG. 4 is a sectional view showing a part of an actuator according to the second embodiment of the present invention in a state in which the piston rod reaches the full-stroke position.

The second embodiment of the present invention will be described below with reference to FIG. 4.

In this embodiment, the cylinder 2 and a stopper 7 are integrated. In this case, the stopper 7 can be integrated with, e.g., a cylinder head 20 of the cylinder 2.

In this embodiment, a bottom portion 20d of a cylinder storage recess portion 20c of the cylinder head 20 serves as the butt surface to a piston 3. A vent groove 7a is formed in an inner surface which forms a through hole 20b of the cylinder head 20. The vent groove 7a makes a front end portion 2a of the cylinder 2 communicate with a storage unit 20a of the cylinder head 20. The remaining components including those not illustrated are the same as in the above-described first embodiment. The same reference numerals as in the first embodiment denote the same parts in the second embodiment, and a repetitive description thereof will be omitted.

In this embodiment, the same effect as in the first embodiment can be obtained. In this embodiment, since the cylinder head 20 and stopper 7 are integrated, the number of constituent members of the actuator 1 can be reduced. Since the assembly properties increase, the manufacturing cost can be reduced.

In the first and second embodiments, the threaded piece 21 is used. However, the threaded piece 21 can be omitted. In this case, the male screw of the male screw portion 8c of the piston rod 8 is omitted so that the outer surface of the male screw portion 8c is almost flush with that of the large-diameter portion 8b. Even in this case, when the piston rod 8 reaches the full-stroke position, the gas in the gas chamber G can be discharged outside in the same way as described above. Hence, when the piston rod 8 is pushed into the cylinder 2, the piston rod 8 and piston 3 can easily be returned to the initial state. In the actuator 1, when its front end faces upward, the piston rod 8 and piston 3 can retreat into the cylinder 2 at a predetermined speed because of the weight of the piston rod 8.

Figure 5:
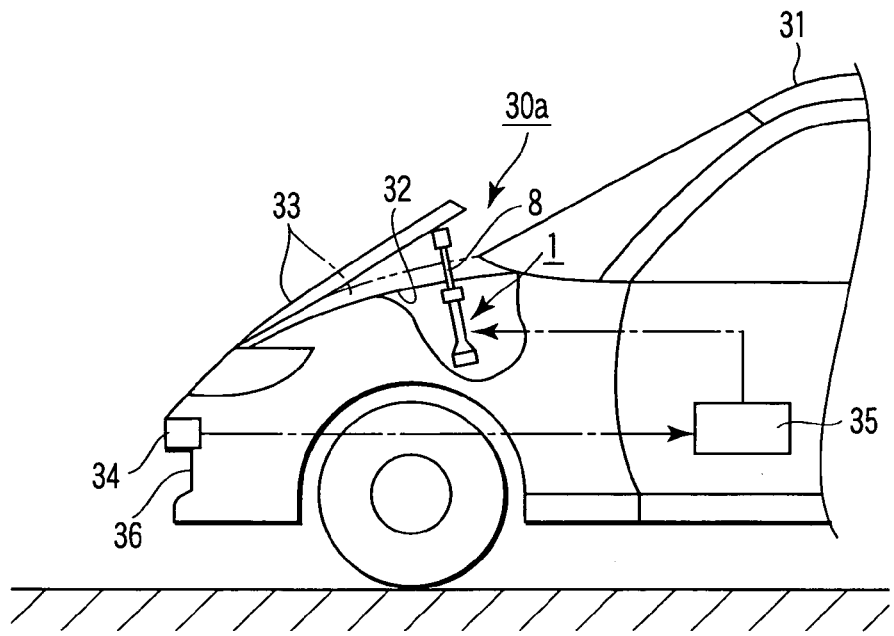
FIG. 5 is a partially cutaway side view showing a hood apparatus having the actuator shown in FIG. 1.

FIG. 5 shows a hood apparatus 30a having the actuator 1 according to the first embodiment. This will be described below assuming that the vehicle travels to the front side.

The hood apparatus 30a can be applied to, e.g., a hood 33 which covers an engine room 32 on the front side of a car body 31 and can be opened/closed. The hood apparatus 30a comprises a collision detection sensor 34, control unit 35, and actuator 1.

The collision detection sensor 34 detects collision between the car body 31 and a pedestrian and is arranged on a front bumper 36. The actuator 1 is arranged under the hood 33 while setting the projecting direction of the piston rod 8 toward the hood 33 (upward). The actuator 1 can be arranged to be either perpendicular to a road surface F or tilted to the front or rear side. When the collision detection sensor 34 detects collision, the control unit 35 supplies a current to the lead wire of the gas generator 5 in the actuator 1.

In the hood apparatus 30a having the above arrangement, when a pedestrian hits the front surface of the car body 31, and the collision detection sensor 34 operates, the actuator 1 operates in synchronism with it. More specifically, a current is supplied to the gas generation body through the lead wire to ignite the gas generation body. The ignited gas generation body quickly burns and jets a gas to the gas chamber G. Accordingly, the pressure in the gas chamber G increases. The piston rod 8 moves and projects from the open end 2d at the front end of the cylinder 2 to push the hood 33 upward by a predetermined amount. When the hood 33 is pushed up, a gap is formed between the hood 33 and the devices in the engine room 32. Even when the pedestrian jumps up and hits against the hood 33, it deforms and absorbs part of energy by shock.

The actuator 1 is designed to discharge the gas from the cylinder 2 when the piston rod 8 reaches the full-stroke position. For this reason, even when the bumper comes into contact with an obstacle, and the hood apparatus 30a operates, the piston rod 8 can easily be returned into the cylinder 2 by threadably inserting the piston rod 8 into the cylinder 2. Hence, the actuator 1 can be reused.

In the hood apparatus 30a, the actuator 1 is arranged such that the piston rod 8 projects upward. When the actuator 1 without the threaded piece 21 is used, the piston rod 8 which has reached the full-stroke position can retreat into the cylinder 2 at a predetermined speed because of the weight of the piston rod 8. Hence, the energy of shock when a pedestrian collides against the hood 33 can further be absorbed.

Figure 6:
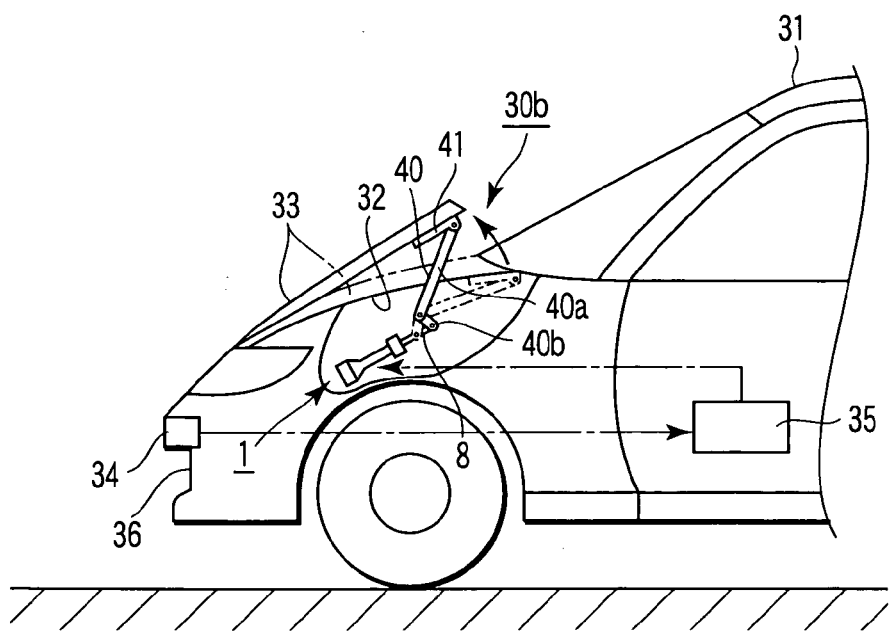
FIG. 6 is a partially cutaway side view showing another hood apparatus having the actuator shown in FIG. 1.

FIG. 6 shows another hood apparatus 30b having the actuator 1 according to the first embodiment. The hood apparatus 30b comprises a link member 40. The link member 40 has, e.g., a long portion 40a and short portion 40b. The long portion 40a and short portion 40b are connected such that an angle α between them is an obtuse angle ($0° \leq \alpha \leq 180°$). The actuator 1 is arranged under the hood 33 while setting the projecting direction of the piston rod 8 to the rear side. Hence, the piston rod 8 of the actuator 1 projects to the rear side of the car body 31. The front end portion of the piston rod 8 is connected to the distal end of the short portion 40b of the link member 40. A connecting member 41 to connect the link member 40 to the hood 33 is arranged inside the hood 33. The distal end of the long portion 40a of the link member 40 is connected to the connecting member 41. That is, in the hood apparatus 30b, the actuator 1 is designed to push the hood 33 through the link member 40. The remaining components and functions are the same as in the hood apparatus 30a shown in FIG. 5.

In the hood apparatus 30b shown in FIG. 6, the same effect as that of the hood apparatus 30a shown in FIG. 5 can be obtained. The hood apparatuses 30a and 30b shown in FIGS. 5 and 6 may have the actuator 1 of the second embodiment or the actuator 1 having no threaded piece 21 instead of the actuator 1 of the first embodiment.

The actuator according to the present invention can be applied to various kinds of apparatuses except the above-described hood apparatuses 30a and 30b. The actuator according to the present invention can also be applied to a seat apparatus designed to push the distal end portion of a seat to suppress the so-called submarine phenomenon, a buckle pretensioner having an actuator which pulls a buckle in a direction in which the seatbelt strains, or a seat apparatus having a buckle pretensioner.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An actuator comprising:
    a hollow cylinder which has a first portion with an open end and a second portion, the cylinder having the first portion with a larger inner diameter than that of the second portion;
    a piston which has an outer surface with a groove portion along a circumference of the outer surface, the piston being inserted in the cylinder;
    a gas generator which supplies a gas into the hollow cylinder and moves the piston in a direction toward the first portion by pressure of the gas;
    a seal member which is arranged in the groove portion, the seal member forming an airtight seal between the piston and the hollow cylinder when the piston is located in the second portion of the cylinder, and allowing the gas to flow between the piston and the hollow cylinder when the piston is located in the first portion of the cylinder;
    a hollow stopper which is arranged in the first portion of the hollow cylinder and stops movement of the piston when the piston abuts against the hollow stopper, the hollow stopper having a vent groove which is formed on an inner surface and connects an interior of the hollow cylinder to the open end of the hollow cylinder;
    a piston rod which has an external thread and is jointed to the piston and at least partially housed in the hollow cylinder, the piston rod being movable along an axial direction of the hollow cylinder as the piston moves; and
    a threaded piece which has an internal partial thread engaged with the external thread of the piston rod by moving in a radial direction of the piston rod and locks the piston rod to prevent the piston from moving in the direction toward the gas generator when the piston rod is pushed out from the first portion of the hollow cylinder.

2. An actuator according to claim 1, wherein the cylinder and the stopper are provided in the form of a molding.

3. An actuator according to claim 2, wherein the cylinder has a cylinder head, and the stopper is integrated with the cylinder head.

* * * * *